April 14, 1964 A. ZAHNER ETAL 3,129,006

AUTOMATIC RECORD CHANGER

Filed Jan. 16, 1961 4 Sheets-Sheet 1

INVENTORS

ADRIEN ZAHNER
LOUIS THÉVENAZ
By Irwin S Thompson
ATTY.

INVENTORS

ADRIEN ZAHNER
LOUIS THEVENAZ

By Irwin S. Thompson
ATTY.

AUTOMATIC RECORD CHANGER

INVENTORS
ADRIEN ZAHNER
LOUIS THEVENAZ
By Irwin S. Thompson
ATTY.

April 14, 1964 A. ZAHNER ETAL 3,129,006

AUTOMATIC RECORD CHANGER

Filed Jan. 16, 1961 4 Sheets-Sheet 4

INVENTORS
ADRIEN ZAHNER
LOUIS THEVENAZ
BY Irwin S. Thompson
ATTY.

United States Patent Office 3,129,006
Patented Apr. 14, 1964

3,129,006

AUTOMATIC RECORD CHANGER

Adrien Zahner, Prilly, Vaud, and Louis Thévenaz, Les Rasses, Vaud, Switzerland, assignors to Thorens S.A., Sainte-Croix, Vaud, Switzerland, a corporation of Switzerland Filed Jan. 16, 1961, Ser. No. 83,060
Claims priority, application Switzerland Jan. 20, 1960
13 Claims. (Cl. 274—10)

The automatic record changers, the most widely circulating actually, are of the type comprising a central record supporting spindle; the records to be played, being traversed in their center by this spindle which extends along the central axis of the turntable, are supported in a pile through a bearing surface provided in said spindle. Each record is successively freed of said bearing surface and slides along the spindle until the playing position is reached, in which it rests on the turntable or on the already played records piled up on said turntable.

There exist numerous systems enabling to bring automatically the needle of the pick-up of such a record changer successively in the first grooves of the records of different diameters mixed up in any way.

One of these systems, amongst the best known, comprises a feeling finger articulated on the frame of the changer and which is partially located in the way of the records sliding along the central rod. According to the diameter of the record coming down in playing position, the feeling finger is pushed away of a determined quantity towards the outside. This variable stroke is used to set in place a system of abutment members which determines in its turn the position of the beginning of the play of the pick-up. An example of such an automatic selecting system of the record's diameter is described in the U.S. Patent No. 2,831,693.

The short time which is allowed to effect the feeling operation, the records coming down generally in free fall, the masses and the accelerations coming in consideration in such devices, do not enable to obtain precise displacements of the feeler. Thus, the manufacturer has to be glad enough to detect through this means the presence of a record of one or the other of the well determined diameters: 30 and 25 cm., the records of 17.5 cm. coming not in touch with the feeler.

Other systems have been proposed in which the feeler detects the diameter of a record to be played when it is located either still in storage position, the lowest record of the pile, or already in playing position. These systems disposing of the thickness of the record only, to influence the feeler are complicate and delicate. In fact, the differences of the thickness and of flatness of the record of different fabrications having a same diameter so as the variable shape of their outer edge, are often the cause of malfunctions. See for example the U.S. Patent No. 2,512,121.

In order to simplify and to give more security to the selecting device of the diameter, one has proposed to use the pick-up arm itself to feel the diameter of the record to be played. One may suppress in this way the feeler and all its control device.

Three different systems of this type are known today. In the first used, the pick-up arm is displaced until it comes inside of the periphery of the smallest record to be played, it comes then in contact with the upper face of the record in playing position through the intermediary of a feeler or of a roller which is located at a level lower than the one of the pick-up needle. Taken back to the periphery by a spontaneous or controlled movement of the pick-up arm, this feeler or roller determines the stopping of said centrifugal movement and causes the setting in contact of the needle with the record as soon as this feeler has reached the outer edge of said record. See for example, the U.K. Patent No. 840,888.

The second system consists of bringing the pick-up arm at the inside of the periphery of the smallest record to be played, and then to bring a feeler, located on the pick-up arm in contact with the lower face of the lowest record of the storage pile and finally to bring back said arm towards the periphery until the moment when the feeler detects the outer edge of said lowest record, thus causing the stopping of the centrifugal displacement.

In these two first systems, the devices intended to stop the centrifugal displacement of the pick-up arm as soon as the feeler reaches the outer edge of the record to be played have shown to be complicate and delicate to build.

The third system of selection of the record's diameter foresees a stop of the record to be played during its coming down along the central rod in an intermediate position between the storage position and the playing position.

The pick-up arm is simultaneously displaced through the cycle mechanism of the record changer towards the center of the record and that displacement is stopped by a fixed member fast with said arm and abutting against the outer edge of the record. The arm thus stopped is entirely disengaged from the records already played or to be played. The control mechanism of the changer may continue its movement after the immobilization of the pick-up arm through said abutment coming in contact with the outer edge of the record, thanks to a friction control device. This control mechanism causes then a centrifugal displacement of a determined amplitude of the arm, freeing the record which comes then down into playing position and then a centripetal displacement of the arm of a greater but well determined amplitude brings the needle on top of the first grooves.

The automatic record changer, object of the present invention is provided with an automatic selecting device of the diameter of the records to be played comprising a pile of stored records of different diameters piled up in an indifferent way, the lower record of which rests on bearing surfaces provided on a record bearing rod passing through them by means of their central hole so as with a distributing device of the records causing the freeing one at a time of the records of said storage pile, each of them coming then successively in playing position on the turntable in order to be read out by a needle carried by a pick-up arm. This record changer tends to remedy to the drawbacks of the precited devices and enables to simplify them and to increase their working security by the fact that the pick-up arm is provided with a feeler device comprising a first retractable feeler located under the point of the needle and at an horizontal distance of said needle, on the side opposed to that of the turntable axis, corresponding to the mean distance separating the outer edge of a record from the first grooves preceding the recording and by the fact that during the displacement of a record from its storage position to its playing position, an actuating devices causes, on the one hand, a radial displacement of the pick-up arm which is limited by said first retractable feeler coming in contact with the outer edge of the record, and on the other hand, a displacement of the pick-up arm parallel to the axis of the turntable.

The attached drawing illustrates schematically and by way of example one embodiment of the present invention.

Figure 8:
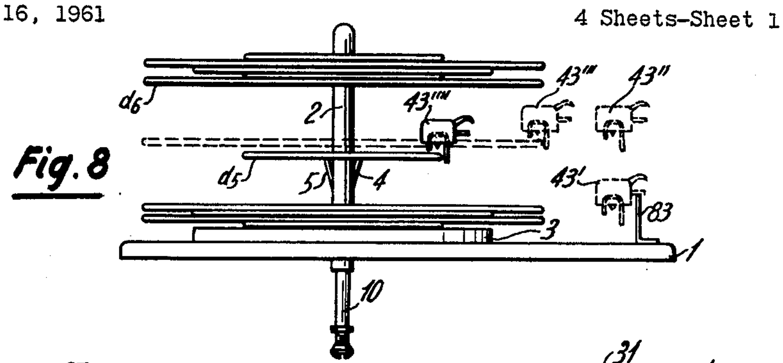
FIG. 8 is a general schematic view of the record changer showing the different positions of the pick-up and of the records.

The record changer according to the invention comprises a base plate 1 which supports a record bearing rod 2 around which pivots a turntable 3. A storage pile, comprising records $d_5$, $d_6$, $d_7$, $d_8$ of different diameters, rests in stopped or playing position of the machine by means of its lower record $d_5$ on three bearers 4, 5 and 6 formed by the apex extremities of three blade springs 7, 8 and 9 fixed by their lower extremities to a control rod 10 which slides inside the record bearing rod 2. The bent extremities of the springs 7, 8 and 9 forming the three bearers 4, 5 and 6 come out of the rod 2 through three longitudinal slots 11, 12 and 13. Widenings 14, 15 and 16 located below their bent portions keep the three springs inside a longitudinal cylindrical opening 30 provided in the rod 2 in order to ensure that the records of the storage pile are kept in a horizontal position without the aid of an equilibrating device resting on the top of said pile.

At the height of the second record $d_6$ of the storage pile, the rod 2, the main diameter of which is slightly less than the one of the central hole of the records, comprises a part 17 of lower diameter, extended by a portion 18 of even lower diameter, thus defining two circular shoulders 19 and 20.

On the first shoulder 19 rests a thin metallic washer 21 closing the extremities of the slots 11, 12 and 13 and then a socket of rubber 22 of a length slightly greater than the thickness of a record and of an outside diameter equal to that of the rod 2. This socket constitutes a retaining device of the second record.

A tubular member 25, of a same diameter than the rod 2, slides in its lower part 23 on the part 17 and in its upper part 24 on the part 18 of the rod 2 and bears on the upper front face of the rubber socket 22. It is submitted to the action of a coil spring 26 engaged on the portion 18 of the rod 2 and bearing, on the one hand, on the upper front face of the member 25 and, on the other hand, on a nut 27 locked by a lock-nut 28 screwed on the threaded extremity 29 of said portion 18.

A covering member 31, of same outside diameter than the rod 2, fixed by means of two screws 32 and 33 to the tubular member 25 extends the latter towards the top and forms the upper extremity of the record bearing rod.

A cylindrical bore 34 extends the opening 30 of the rod 2 through its extremity 17, 18. This bore is of a smaller diameter than the opening 30. A rod 35 sliding freely in that bore, bears through its lower end on the upper front face of the control rod 10 and through its upper end on a regulating screw 36 screwed in a threaded bore 37 provided in the upper end of the covering member 31. A spring pin 38 fixed in a groove provided in the rod 35 defines the axial position of said rod 35.

Figures 1, 2, 3:
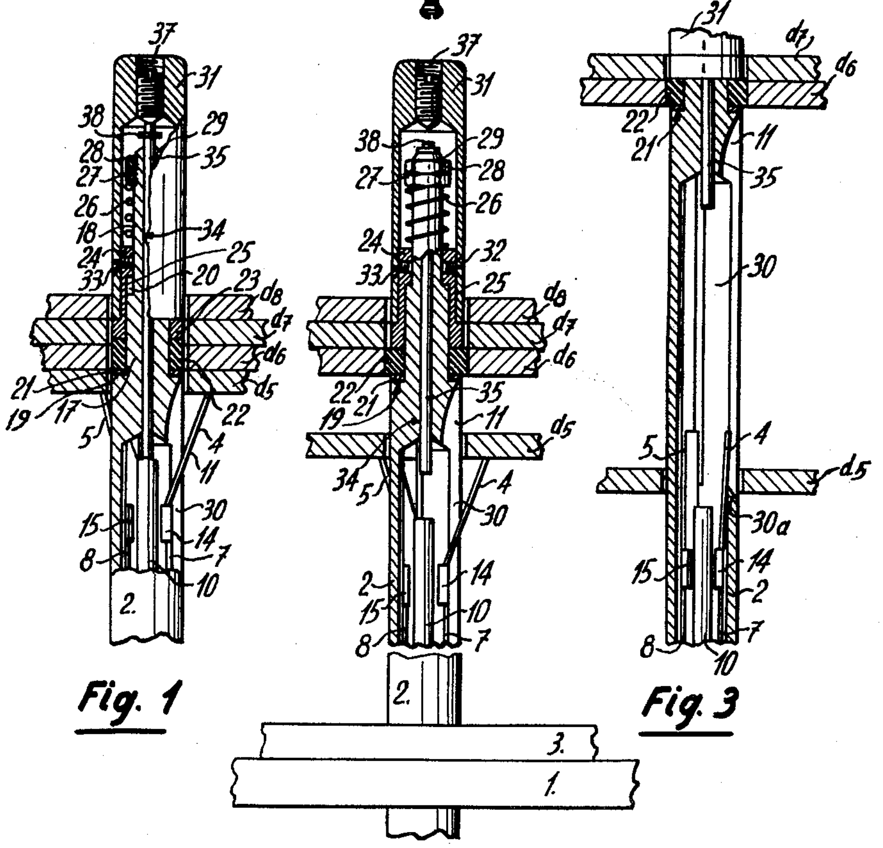
FIG. 1 is a longitudinal cross-section along the axis of the record feeding mechanism, the record changer being in its playing or rest position.
FIGS. 2 and 3 show the record feeding mechanism in two states of the descent of a record from the storage pile to the turntable.

In the playing or rest position of the record changer, illustrated in FIG. 1, the control rod 10 is in a position such that it acts on the rod 35 and keeps it in an elevated position. That rod 35, acting on the regulating screw 36, keeps the covering member 31 and the tubular member 25 in an elevated position against the action of the spring 26; the screw 36 enables to adjust the elevated position of said member 25, so that the rubber socket 22 is not squeezed and that its outside diameter is also equal to the one of the rod 2.

The pick-up arm is pivoted around a horizontal axis 42 fast with a yoke 41 fixed on the upper end of a sleeve 40 revolving freely in a socket 39 rigidly connected to the base plate 1.

The actuating device of the pick-up arm comprises an actuating member 44 fixed on the lower extremity of the socket 40 and provided with a shoulder 45 and two abutments 46, 47 located on the one and the other side of a support 48 rigidly fastened on the base plate 1. This actuating member 44 co-operates with a sector 59 pivoted around an axis 60 fastened on the frame 1. This sector is angularly displaced in the horizontal plane by means of a member 61 hinged in 62 on said sector and actuated through the control mechanism of the cycle of the record changer.

Said actuating device of the pick-up arm comprises further a liftage rod 49 sliding inside the socket 40 and which bears through its lower end on an ear 50 of a lever 51 hinged in 52 on the support 48. This lever 51 is controlled by the control mechanism of the cycle of the record changer through the intermediary of a tie rod 56 provided with an abutment 57 which acts on the ear 58. At this same lower end, the liftage rod 49 carries a spring support 53 constituting an abutment for the lower extremity of a coil spring 54 the other extremity of which bears on the lower end of the socket 40.

Said control mechanism of the cycle of the record changer comprises a toothed pinion 100 fast on the turntable axis, meshing with a toothed wheel 101 fast on an actuating shaft 102 and driving said shaft at a speed in relation to the speed of the turntable. Said shaft 102 carries a first cam 103 controlling the displacements of said member 61.

Said shaft 102 carries further a second cam 104 controlling the displacements of a lever 105 pivoted on the frame of the changer at 106 which is drivingly connected to said tie rod 56.

At least, said shaft 102 carries a cam 115 controlling the displacements of a push member 107 actuating a reverse switch 108 having three positions. In a first position said switch 108 sets a motor 109 under voltage so that it revolves in the clockwise direction. In a second position said switch disconnects said motor 109, and in a third position it sets said motor under voltage so that it revolves in the counter clockwise direction.

The driving shaft 110 of said motor 109 carries a pinion 111 which meshes with a rack 112 provided on the lower extremity of the control rod 10. Said motor 109 is thus able to displace said control rod 10 from its low to its elevated position and vice versa.

At its free extremity the pick-up arm 43 carries a pick-up cartridge 64 provided with a needle 65 intended for the reading of the records.

It also carries a feeler device comprising two levers 67 and 69 hinged in 68 and 70 on the arm, in order to oscillate in a vertical plane between a stable retracted position and a stably armed or working position.

The first lever 67 comprises two arms of different lengths: the longer 71, directed towards the front end of the pick-up arm, is provided with a member 72 having the general shape of a U, the two branches of which 73 and 74, constituting a first and a second feeler, are of unequal lengths and are situated in a plane perpendicular to that containing the lever 67 and located in front of the pick-up cartridge 64. The shorter arm 75 is terminated by an ear 76 co-operating with a locking notch 77 carried by the only arm of the second lever 69 which carries at its free extremity a pin 80 projecting out with respect to the outside wall of the pick-up arm through a slot 81 provided in the lateral wall of said arm.

Figure 6:
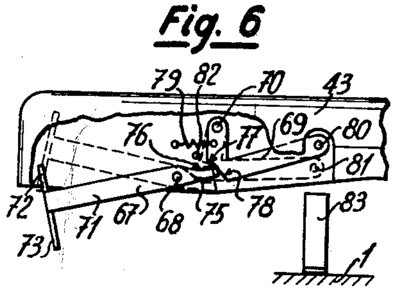
FIG. 6 is a detail view of the retractable feeler indicating the different positions it may occupy.

The retracted position, illustrated in dotted lines on FIG. 6, is determined by an abutment 82, fast with the pick-up arm, against which the second lever rests under the action of its spring 79. The bench 78 of said second lever acts on the ear 76 of the first lever and maintains it in a position such that the feelers 72 and 74 are entirely retracted in the inside of the pick-up arm.

An upward thrust exerted on the pin 80 against the action of the spring 79, displaces the feeler device up to its armed position, illustrated in full lines on FIG. 6. Under the action of the gravity acting on its arm 71, the first lever turns until its ear 76 engages the locking notch 77 of the second lever.

Figure 9:
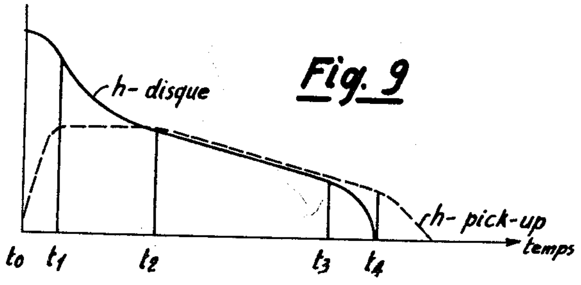
FIG. 9 is a graph which represents in function of the time, the height of the pick-up and of the record coming down from the storage pile to the turntable.
Figure 15:
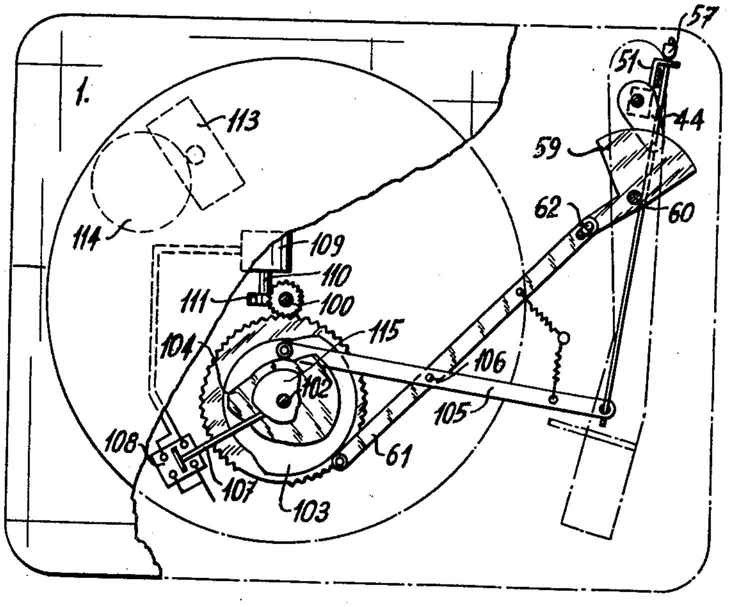
FIG. 15 is a schematic top view, illustrating the mechanism of the cycle and the actuating device of the turntable.

The working of the record changer described can be followed on the graph of FIG. 9 illustrating, on the one hand, the descending stroke of the lowest record $d_5$ of the storage pile in function of the duration of the operations of the record changer and, on the other hand, the height displacements of the pick-up needle during the same time.

In the rest position of the record changer, the acuating motor 113 of the turntable and of the control mechanism is stopped and the arm of the pick-up occupies the position 43' illustrated at FIG. 8. Said motor 113 actuates said turntable through an intermediary wheel 114 as described for example in the U.S. Patent No. 2,704,461. Said arm 43 rests, through the intermediary of the pin 80 on a bearer 83 fixed on the base plate 1. The feeler device is in its armed position.

When the user wants to play a record, he puts the motor 113 under voltage. This motor drives the control mechanism, which causes at the initial time $t_0$ the progressive lowering, very slowly at the beginning, of the control rod 10 within the record bearing rod 2. This very slow start is necessary to enable the bearing surfaces 4, 5 and 6 to follow the separating movement of the lowest record which generally adheres to the pile through a draught hole like action. It has to be avoided that the bearing surfaces lead the record $d_5$ what would have for result a start in free fall and then an abrupt stop of said record on the bearing surfaces which could cause a tilting of the often badly equilibrated record.

Under the action of the spring 26, the rod 35, the covering member 31 and the tubular member 25 follow that downward movement, compressing the rubber socket 22 the outside diameter of which becomes greater and clamps the last but one record of the storage pile by its central hole and retains that record in axial position. The lowering of the control rod 10 continues and an inside shoulder 25a of the tubular member 25 comes in contact with the shoulder 20 of the rod 2, immobilizing the covering member 31. The rod 35 moves away from the screw 36 and is finally retained by the pin 38 which rests then on the extremity 29 of the rod 2.

On the other hand, the flat springs 7, 8 and 9 fixed on the control rod 10 are taken in the downward displacement of said latter and the last record $d_5$ of the storage pile, resting on the bearing surfaces 4, 5 and 6 of said springs, moves away from the last but one record $d_6$, retained in position by the pressure of the rubber socket 22. Said record $d_5$ lowers along the record bearing rod, as illustrated in FIG. 2.

Reaching the lower extremities of the slots 11, 12 and 13 of the rod 2, the bent ends 4, 5 and 6 of the springs 7, 8 and 9 are forced, by the wall 30a of the opening 30, to retract themselves inside the rod, as illustrated at FIG. 3. The record $d_5$ thus liberated, descends then under the action of its own weight on the turntable or on the records which rest on said turntable.

The control mechanism of the cycle of the record changer causes then the reascending up of the control rod 10 until its initial elevated position. As soon as the rubber socket 22 is sufficiently released, the record $d_6$ and the whole pile of stored records slides along the rod. Said record $d_6$, which is now the lowest record of the pile, rests on the bearing surfaces 4, 5 and 6.

The control mechanism of the cycle, acting further through the intermediary of the rod 56, causes then a rotation of the lever 51 in a clockwise direction. The liftage rod 49 acting on the ear 50 of said lever causes the lifting of said latter. The force of the spring 54, greater than the weight of the pick-up arm and of its pivoting system, transmits this movement to the socket 40 and finally to the pick-up arm 43 which rests in 55 on the upper end of the rod 54, so that said arm is then lifted while staying parallel to itself.

As soon as members 44 come, through the intermediary of its shoulder 45, in contact with the sector 59, the upward displacement of the socket 40 is stopped. The lever 51 continues its rotation against the action of the spring 54 and causes the reascending of the pick-up arm which pivots around its horizontal axis 42 until its free extremity 63 occupies the position 43'' at time $t_1$ where the control mechanism of the cycle immobilizes the lever 51.

Figure 4:
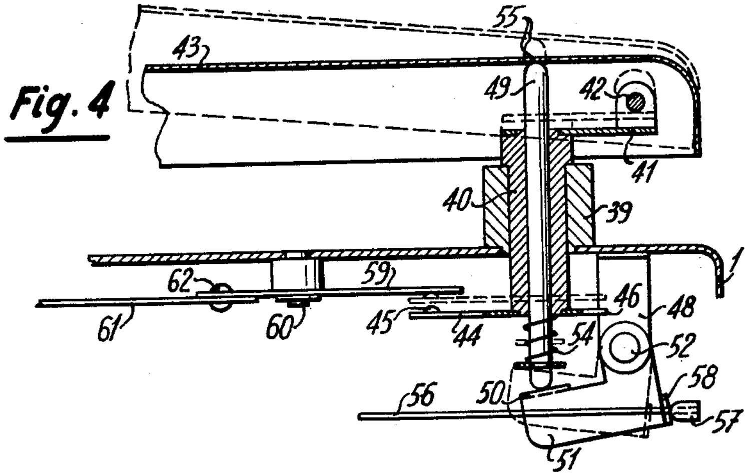
FIG. 4 is a section of the pick-up arm and of its actuating device going through the horizontal pivoting axis of said pick-up arm.
Figure 5:
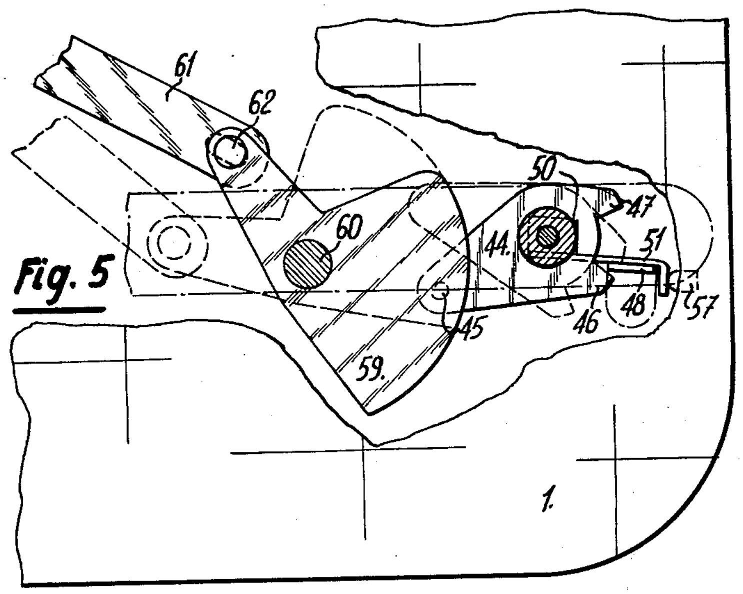
FIG. 5 is a top view of the actuating device of the pick-up arm.

From time $t_0$ to time $t_1$, the actuating member 44, the sector 59 and the member 61 occupy the positions illustrated in full lines in FIGS. 4 and 5, and the bearer 46 rests on the support 48.

From time $t_1$ on, the control mechanism of the cycle causes a rotation in the counter clockwise direction of the sector 59. It drives, by friction on the shoulder 45, the actuating member 44 in rotation in the clockwise direction and, as a consequence, the pick-up arm towards the record bearing rod 2 from the position 43'' to the position 43''' located at the same height and that it reaches at time $t_2$.

During the time interval $t_1$, $t_2$, the control rod 10 of the record bearing rod has continued its downward movement, however, it has progressively decreased its speed.

During the time interval $t_2$ to $t_3$ which follows, the sector 59 continues its rotation and the pick-up arm its movement towards the record bearing rod 2 as described hereinafter, as long as it is not stopped through the periphery of a record resting on the bearing faces 4, 5 and 6. In absence of any record, the total stroke of the sector 59, is of such an amplitude that when reaching the position illustrated in dotted lines on FIGS. 4 and 5, the actuating member 44 has been brought by friction in its end stroke position, defined by the abutment 47 resting on the support 48. The pick-up arm is then situated inside the periphery of the smallest record to be played.

During this same time interval, the control mechanism of the cycle of operations causes a rotation in the counter clockwise direction of the lever 51, what is expressed by a progressive lowering of the pick-up arm. The speed of that lowering is exactly the same as the lowering speed of the control rod 10.

Figure 10:
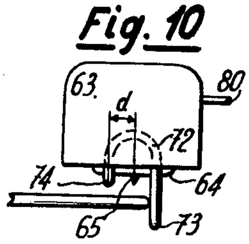
FIGS. 10 to 13 show different relative positions of the record coming down and of the head of the pick-up carried by the pick-up arm.

These three movements: lateral displacement of the pick-up arm, lowering of said arm and lowering of the bearing surfaces of the record bearing rod, are co-ordinated so that if a record of a diameter comprised within the maximum and minimum diameters foreseen for the record changer is carried by the bearing surfaces 4, 5 and 6, the displacement of the pick-up arm towards the center of the turntable is limited by the feeler 73 abutting against its periphery as illustrated on FIG. 10. The second feeler 74 and consequently the needle 65, are located above the upper surface of said record. By way of example, FIG. 8 shows in 43''' the coming in contact of the feeler 73 with a record of the greatest diameter at time $t_2$ and in 43'''' the coming in contact of said feeler with a record of the smallest diameter at time $t_3$. For records of intermediary diameters, the coming in contact occurs at a determinate instant for each diameter within the times $t_2$ and $t_3$.

From that coming in contact, the actuating member 44 stays still and the sector 59, which continues its movement under the action of the control mechanism of the cycle, slides along the shoulder 45.

Soon after the instant $t_3$, the control rod 10 following its downward displacement, the bearing surfaces 4, 5 and 6 reach the lower end of the slots 11, 12 and 13 and retract themselves inside the rod 2, escaping to the record they support, so that said record falls freely in playing position.

The pick-up arm, on the contrary, follows its downward displacement at reduced speed until time $t_4$, the record $d_6$ having however escaped the feeler 73 in the meantime. Since the displacement of the sector 59 has stopped from the instant $t_3$ on, but that the actuating member 44 is still maintained against this sector through the action of the spring 54, the pick-up arm stays in the exact angular position which has been defined by the coming in contact of the feeler 73 with the periphery of the record to be played, during its displacement along the rod 2.

Figure 12:
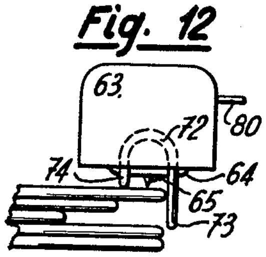
Figure 13:
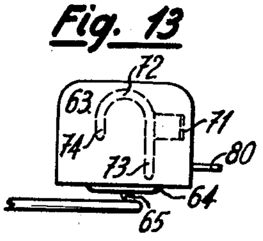
Figure 11:
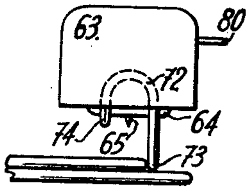

From the instant $t_4$, the rotative movement of the lever 51 in the counter clockwise direction, is accelerated and the pick-up approaches the surface of the record placed in playing position until the feeler 74 rests on the record (FIG. 12), in the case of records of all the same diameter or in the case of the playing of a record of maximum diameter or that the feeler 73 takes contact with a record of greater diameter which was played before (FIG. 11).

The pick-up continuing its downward movement, a push equal to its weight is exerted upwards on the feeler 74, causing the pivoting of the first lever 67 in the clockwise direction and the disengagement of its ear 76 of the lock notch 77 of the second lever 69. Under the action of the spring 79 the two levers pivot them until their retracted position (FIG. 6) and the pick-up needle comes freely in contact with the surface of the record to be played at a distance of the periphery, in direction of the center of the turntable, equal to the horizontal distance $d$ separating the point of the needle 65 from the inside face of the feeler 73 (FIG. 10). Said distance is foreseen to correspond to the mean distance separating the periphery of a record from its first grooves, preceding the registration. During the remaining of the stroke of the lever 51, the rod 49 loses the contact with the pick-up arm and, as soon as the spring 54 is released, the shoulder 45 of the actuating member 44 loses the contact with the sector 59. The pick-up arm may then pivot freely around its vertical axis during the reading of the record.

At the end of the hearing of the record, the control mechanism of the cycle of operations brings back the pick-up arm in its rest position 43'. The pin 80 rests on the bearer 83, and under the action of the weight of the pick-up, said pin 80 is pushed back upwards and causes thus the rearming of the feeler device against the action of the spring 79, so that said feeler device is again in its working position.

Figure 7:
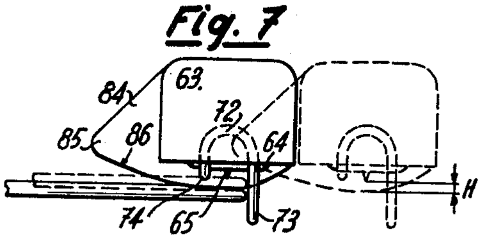
FIG. 7 illustrates cam means attached onto the pick-up arm to stabilize the record during the selection of its diameter.

FIG. 7 illustrates a variant of that record changer. The records being often not homogeneous, it may happen that they have a tendency to incline themselves during their lowering when they rest on the bearing surfaces

4, 5 and 6. In order to reduce this phenomenon to a value which does not affect the good working of the selecting device, it is recommended to incline one of the bearing surfaces in the general direction of the displacement of the feeler 73, so that the outer edge of the record, disposed on the same side of the rod 2 as the pick-up, has the tendency to be higher than its opposed edge rather than the reverse, in order to avoid that the feeler 73 passes on top of the periphery of the record. In FIG. 7, the record $d'_5$ is supposed to be horizontal, but the record $d''_5$ is slightly inclined in the direction indicated.

In order to avoid that the feeler 74 may abut against the periphery of the lifted outer edge of a record inclined in said way, the pick-up arm is provided, at the rear of the pick-up cartridge 64, with a shaped stop 84 which jets out on the inner lateral face and on the lower face of the arm by means of a curve 86, and located at a height such that the most inclined record with respect to the bearing surfaces 4, 5 and 6 abuts firstly against the curve 86 and is progressively straightened by the profile of said latter during the centripetal movement of the arms, until it abuts on the feeler 73. The maximum height H of the curve 86 underneath the point of the needle 65 and its location on the pick-up arm are calculated so that when the pick-up is in playing position, the inclination of the arm 43 with respect to the horizontal is sufficient in order that the needle 65 and not the curve 86 comes in contact with the record.

In the preceding description, it can be seen that the selecting device of the diameter of the records to be played enables to bring the pick-up needle in an entirely automatic way in the first grooves of a record of any diameter comprised between a maximum and a minimum.

From the attached drawings, it is easy to see that the selecting device described works also in the case where instead of letting the record go down in a continuous movement during the feeding operation, the latter is immobilized during that operation, at a well determined level between the storage pile and the playing position.

But in the device described, the accelerations to which the record is submitted may be reduced to a minimum and thus the risks of tilting which result of such accelerations and the corresponding errors of selection are practically eliminated.

Figure 14:
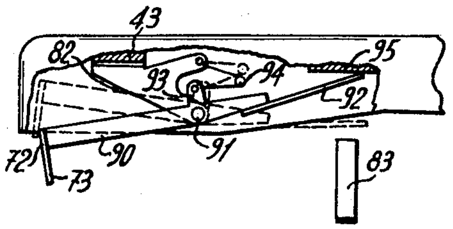
FIG. 14 is a detail view of a variant of the retractable feeler, indicating the different positions it may occupy.

FIG. 14 shows a variant of the feeler device comprising only one lever 90 articulated in 91 on the arm and adapted to oscillate in a vertical plane between a stable retracted position and a stable armed or working position. This lever carries at its extremity directed towards the front of the pick-up the member 72 forming the two feelers 73 and 74 whereas its rear extremity is provided with a blade 92. This lever 90 comprises further a protuberance 93. A hair needle like spring 94 is fixed, on the one hand, on said protuberance and, on the other hand, on the pick-up arm.

The retracted position of the lever 90 is determined by the stop 82 fast with the pick-up arm against which rests the fore part of said lever, whereas the working position is determined by an abutment 95 against which rests the blade 92. The position of the spring 94 is such that it tends to maintain the lever 90 as well in its retracted position as in its working position.

A thrust exerted upwardly on the blade 92 against the action of the spring 94, displaces the feeler device in its armed position, shown in full lines on FIG. 14. When the pick-up comes in contact with the record, the feeler 74 causes the pivoting in the clockwise direction of the lever 90 until its retracted position.

We claim:

1. In an automatic record changer comprising a frame, a turntable, a motor for said turntable, a spindle centrally mounted with respect to said turntable, a record-supporting means provided on said spindle to hold a stack of records on said spindle above said turntable, lowering means associated with said supporting means to lower said records individually on said turntable, a supporting member pivotally mounted on said frame for free horizontal movement, a pick-up arm pivotally mounted on said supporting member for free vertical movement, cycle control means actuated by said motor and comprising first cam means to control a horizontal movement of said supporting member from a rest position, in which said pick-up arm is situated outside the periphery of said records, towards said spindle through a friction coupling and second cam means to control a vertical movement of said pick-up arm and of said record lowering means, a pick-up cartridge on said pick-up arm provided with a needle for playing said records supported by said turntable, and retractible feeler means comprising a first feeler member movably mounted on the free end of said pick-up arm for free movement between two stable positions, said positions including an active position in which said feeler is situated below said needle and at a distance from said needle corresponding to the mean distance between the periphery of said records and the non-modulated grooves preceding the first modulated grooves of said records, and an inactive position in which said feeler is situated above said needle, said cycle control means through horizontal and vertical movement of said pick-up arm bringing said feeler situated in said active position against the periphery of each of said records during its individual lowering movement toward said turntable to stop the horizontal movement of said pick-up arm against the action of said friction coupling until said needle is located above the first grooves of the record to be played, said cycle control means subsequently lowering said pick-up arm towards said record lowered on said turntable, said feeler coming in contact with said record and being urged into its inactive position by said downward movement of said pick-up arm bringing the needle into the record groove.

2. A record changer as claimed in claim 1 in which said feeler means includes a second retractable feeler, and means connected to said second feeler for simultaneously retracting both said feelers when said second feeler comes in contact with the upper face of said record to be played.

3. A record changer as claimed in claim 2 in which said lowering means guides the record to be played during at least a part of its descent towards said turntable, a control mechanism of the cycle of the record changer controlling the displacement along the record supporting means, a retaining device maintaining the remaining storage pile in position.

4. A record changer as claimed in claim 3 in which said cycle control means causes firstly an upward displacement of said pick-up arm, and then a downward displacement of it, parallel to the axis of the turntable, and in which these displacements are synchronized with the displacements of a record on at least one part of its stroke from its storage position to its playing position, so that during at least a part of its lowering movement said first feeler is always located in a plane parallel to the turntable passing through said record to be played.

5. A record changer as claimed in claim 4 in which said first retractable feeler comes in contact with the periphery of said record to be played, when it is in movement along said record supporting means.

6. A record changer as claimed in claim 5 in which, during the displacement of said record to be played resting on said lowering means along said record supporting means, said cycle control means causes simultaneously a centripetal movement of said pick-up arm, said movement starting at a determined level, higher than the maximum level for the playing of the records, and a lowering of said arm at a speed equal to that of the descent of said record, these movements being co-ordinated in such a way that the relative position of said pick-up arm and of the record at the time when said first feeler comes in contact with the periphery of said record is the same for all the diameters of said record to be played comprised between a determined maximum and minimum.

7. A record changer as claimed in claim 6 in which said retractable feeler means is automatically armed when said pick-up arm is replaced in rest position.

8. A record changer as claimed in claim 7 in which said retractable feeler means comprises a first and a second control lever hinged each separately on said pick-up arm, a lock notch provided on one end of said second control lever, one end of said first control lever co-operating with said lock notch.

9. A record changer as claimed in claim 8 in which a member is carried by the other extremity of said first lever and presents the general shape of a U the branches of which are of different lengths, the longer forming said first and the shorter said second feeler.

10. A record changer as claimed in claim 9 in which said first feeler presents a longer length than said second, said first feeler being intended to co-operate with said outer edge of said record to be played, whereas said second, shorter one co-operates with the upper surface of said record.

11. A record changer as claimed in claim 10 in which said second control lever, hinged by means of one of its extremities, comprises at its other extremity a pin accessible from the outside of the pick-up arm.

12. A record changer as claimed in claim 1 in which said pick-up arm presents, located behind said needle, a shoulder, the lower edge of which shows a shape such that what the possible deformation of the record may be, only the first feeler is able to co-operate with said outer edge of said record.

13. In an automatic changer comprising a frame, a turntable, a motor for said turntable, a record post centrally mounted with respect to said turntable, record-supporting means provided on said post to hold a stack of records on said post above said turntable, lowering means associated with said supporting means to lower said records individually on said turntable, a supporting member pivotally mounted on said frame for free horizontal movement, a control arm fixed to said supporting member, a pick-up arm pivotally mounted on said supporting member for free vertical movement, cycle control means actuated by said motor and comprising first cam means for controlling the horizontal displacement of said pick-up arm mounted on said supporting member through a friction coupling comprising a friction sector pivoted on said frame for horizontal movement and friction means on said control arm, second cam means for controlling the vertical movement of said pick-up arm between a lower and an upper position, means for engaging said friction sector with said friction means of said control arm when said pick-up arm is lifted above said lower position, thus coupling these first cam means with said pick-up arm for horizontal displacement, a pick-up cartridge on said pick-up arm provided with a needle for playing said records when supported by said turntable, retractible feeler means movably mounted on the free end of said pick-up arm for free movement between two stable positions, said positions including an active position in which said feeler is situated underneath said needle, at a distance from said needle corresponding to the mean distance between the periphery and the non-modulated grooves preceding the first modulated grooves of said records and an inactive position in which said feeler is situated above said needle, said cycle control means bringing said feeler situated in said active position against the periphery of each of said records, when supported in an intermediate position above the turntable by said lowering means, through vertical movement of said pick-up arm controlled by said second cam means and through horizontal movement controlled by said first cam means through said friction coupling, to stop the horizontal movement of said pick-up arm, supporting member and control arm against the action of said friction coupling until this record is further lowered to the turntable, said second cam means subsequently lowering said pick-up arm to its lower position whereby said feeler first contacts the record to be played and is brought to its inactive position by the lowering movement of the pick-up arm before the needle enters the groove of said record, the friction sector and the friction means of the friction coupling being then disengaged to enable the pick-up to track the record.

References Cited in the file of this patent

UNITED STATES PATENTS

| | | |
|---|---|---|
| 2,586,422 | Fisher | Feb. 19, 1952 |
| 2,914,329 | Schnell | Nov. 24, 1959 |
| 2,919,924 | Wilton | Jan. 5, 1960 |
| 2,981,953 | Hansen | Apr. 25, 1961 |
| 3,012,789 | Rae | Dec. 12, 1961 |